United States Patent [19]

Gravesteijn et al.

[11] Patent Number: 4,816,385
[45] Date of Patent: Mar. 28, 1989

[54] METHOD OF OPTICALLY RECORDING AND ERASING INFORMATION

[75] Inventors: Dirk J. Gravesteijn; Carolus J. Van Der Poel, both of Eindhoven, Netherlands

[73] Assignee: U.S. Philips Corporation, New York, N.Y.

[21] Appl. No.: 45,506

[22] Filed: May 4, 1987

Related U.S. Application Data

[63] Continuation-in-part of Ser. No. 869,484, Jun. 2, 1986.

[30] Foreign Application Priority Data

Mar. 28, 1986 [NL] Netherlands .......................... 8600811

[51] Int. Cl.$^4$ ................................................. G03C 1/72
[52] U.S. Cl. ..................................... 430/495; 430/19; 430/346; 430/945; 430/964; 346/135.1
[58] Field of Search ................. 430/19, 495, 346, 945, 430/964; 346/135.1, 76 L

[56] References Cited

U.S. PATENT DOCUMENTS 4,637,976 1/1987 Terao et al. ......................... 430/523
4,647,944 3/1987 Gravesteijn et al. ............ 430/945 X

FOREIGN PATENT DOCUMENTS 0177446 9/1985 Japan ................................. 130/495

Primary Examiner—Paul R. Michl
Assistant Examiner—Lee C. Wright
Attorney, Agent, or Firm—Norman N. Spain

[57] ABSTRACT

According to the method a rotating recording element 23 (FIG. 3) having a crystalline recording layer 28 of the composition $Q_xSb_yTe_z$, wherein Q=In, Ga; X=34–44 at. %; y=51–62 at. %; Z=2–9 at. %; is exposed to a pulsated laser light spot 29 (FIG. ) in which amorphous information bits are formed which are read by means of weak laser light 30 and which can be erased in real time during one revolution of the element 23 by means of a laser light erasing spot 33 (FIG. 4) and be returned to the crystalline state.

9 Claims, 2 Drawing Sheets

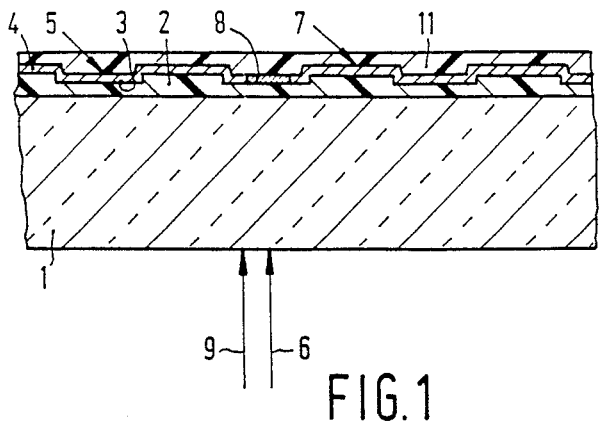
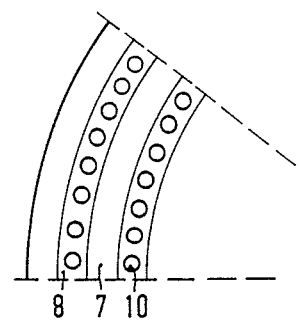
FIG.1　　FIG.2
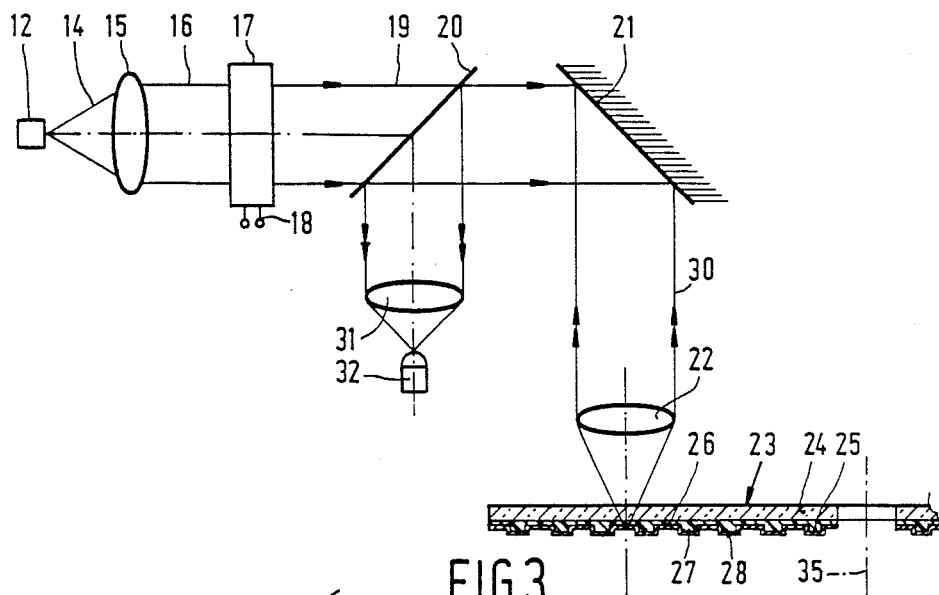
FIG.3
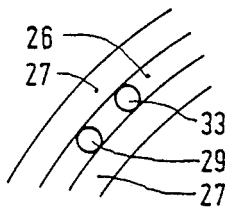
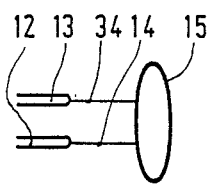
FIG.4　　FIG.5

METHOD OF OPTICALLY RECORDING AND ERASING INFORMATION

This application is a continuation-in-part of application Ser. No. 869,484, filed June 2, 1986, now pending.

BACKGROUND OF THE INVENTION

The invention relates to a method of optically recording and erasing information a disc-shaped recording element which comprises a substrate and a recording layer provided thereon which comprises a crystalline recording material. In this method the disc is rotated and exposed to the light of a recording spot which is moved diametrically over the disc and originates from a laser light beam which is focused on the recording layer and is modulated in accordance with the information to be recorded. As a result amorphous information bits are formed in the exposed places of the recording layer which bits can be read by means of weak laser light and which can be erased by means of an erasing spot originating from a laser light beam focused on the recording layer.

Such a method which is based on crystalline-amorphous phase changes is known, for example, from European Patent Application No. 0,135,370 and from the copending Netherlands Patent Application No. 8403817 in the name of the Applicants. In the known method a Te-Se alloy is used as a recording material which may comprise other elements. A disadvantage of this method is that the erasing time, i.e. the exposure time which is necessary to return the amorphous information area (bit) to the original crystalline phase, is long. For example the erasing time of a Te-Se-Sb alloy is, for example, 50 $\mu$s.

During the recording of information, the reading thereof and erasing the information the recording element is rotated. The linear speed of the element is, for example, from 1 m/s to 15 m/s or more. Upon recording audio(sound)information according to the EFM (eight out of fourteen) modulation system, a linear disk (element) velocity is used of 1.4 m/s. In video information a linear speed of 10–15 m/s is used.

It is highly desirable to perform the erasing process at the same linear disk speed as the recording process, that is erasing in real time. Furthermore it is highly desirable to be able to erase the information during one rotation of the element. For practical applications this presents the very interesting possibility of recording new information directly over the existing information, in which after the existing information has been erased, the new information can be recorded immediately thereon at the same disk speed and in the same rotation run of the element. Such a direct overwrite cannot be realised in magneto-optical recording processes, in which at least one complete revolution of the recording element exists between erasing and re-recording.

In phase change recording with the above-mentioned erasing time of 50 $\mu$s, an erasing process in real time with one revolution of the element also is not readily possible in practice. Even at a very low linear disc speed of 1.4 m/s a slot-shaped erasing spot having a minimum length of 70 $\mu$m must already be used in that case. The erasing spot is the light spot of the laser light beam on the recording layer used in the erasing process. An erasing spot of 70 $\mu$m meets with considerable practical disadvantages due to the required high laser power, as well as the positioning of the spot on the track. At higher disc speeds even an erasing spot having a length in the order of magnitude of mm is necessary, which cannot be performed in practice.

In the published Japanese Patent Application Kokai 60-177446 an optical recording medium is described the recording material of which satisfies the formula $In_{1-x}Sb_xM_y$ wherein M is selected from a group of 13 elements, mostly metals, x is 55-80% by weight and y=0-20% by weight. Upon recording information, the recording material is exposed to modulated laser light. In the exposed places, depending on the rate of cooling, either a semi-stable phase is formed which is termed a $\pi$-phase, or a mixed phase of InSb and Sb. The $\pi$ phase can be transferred to the mixed phase by heating. So there is switched—i.e. recording and erasing processes—between a mixed phase and a $\pi$ phase. This has for its disadvantage that upon converting the mixed phase two constituents are involved. As a result of this the number of switching times—recording and erasing—is restricted although, according to the Kokai, a repeated reproduction is possible. This is a stability problem which is not acceptable for the practical applications. Moreover, the speed of conversion of the mixed phase to the $\pi$ phase is limited because the two components InSb and Sb must be present in a suitable proportion before conversion takes place. In the said Kokai no information is given or details disclosed of the erasing process, particularly the speed of erasing and the quality of the erasing process—the magnitude of a possible rest signal although it is stated that the information can be removed by "scanning" with laser light.

An additional serious disadvantage is the low signal-to-noise ratio of the information bits, which does not enable video recording.

SUMMARY OF THE INVENTION

It is an object of the invention to provide an optical recording method of the type mentioned hereinbefore in which very short erasing times can be used and in particular the recorded amorphous information bits can be erased in real time during one revolution of the recording element.

A further object is to provide an optical recording method in which the recorded information bits can be read with a very high signal-to-noise ratio which on an average has a value of 50 dB and higher as a result of which video recording is possible.

Still another object of the invention is to provide an optical recording method having a high quality of both the recording and the erasing process. The recording process can be carried out at a high recording speed and with a high information density. By means of the erasing process for the recorded information bits are erased to a negligible rest signal so that recording and erasing can be carried out many times and high signal-to-noise ratios are still obtained.

According to the invention these objects are achieved by means of a method of the type mentioned in the opening paragraph which is characterized in that a recording material is used the composition of which satisfies the formula $$Q_xSb_yTe_z$$

wherein Q is the element In or Ga, so x=34-44 at.%; y=51-62 at.%; z=2-9 at.%, that the amorphous information bits recorded in the crystalline recording material can be erased in real time during one revolution of the recording element by means of the erasing spot and thereby returned to the original crystalline state.

BRIEF DESCRIPTION OF THE DRAWING

FIG. 1 is a cross-sectional view of a recording element used in the method of the invention, FIG. 2 is a plan view of a sigment of the element of FIG. 1, FIG. 3 is a diagrammatic cross-sectional view of a device for carrying out the method of the invention, FIG. 4 is a plan view of a part of the recording element used in the device of FIG. 3, FIG. 5 is a plan view of the laser set up employed in the device shown in FIG. 3.

DETAILED DESCRIPTION OF THE INVENTION

Figure 6:
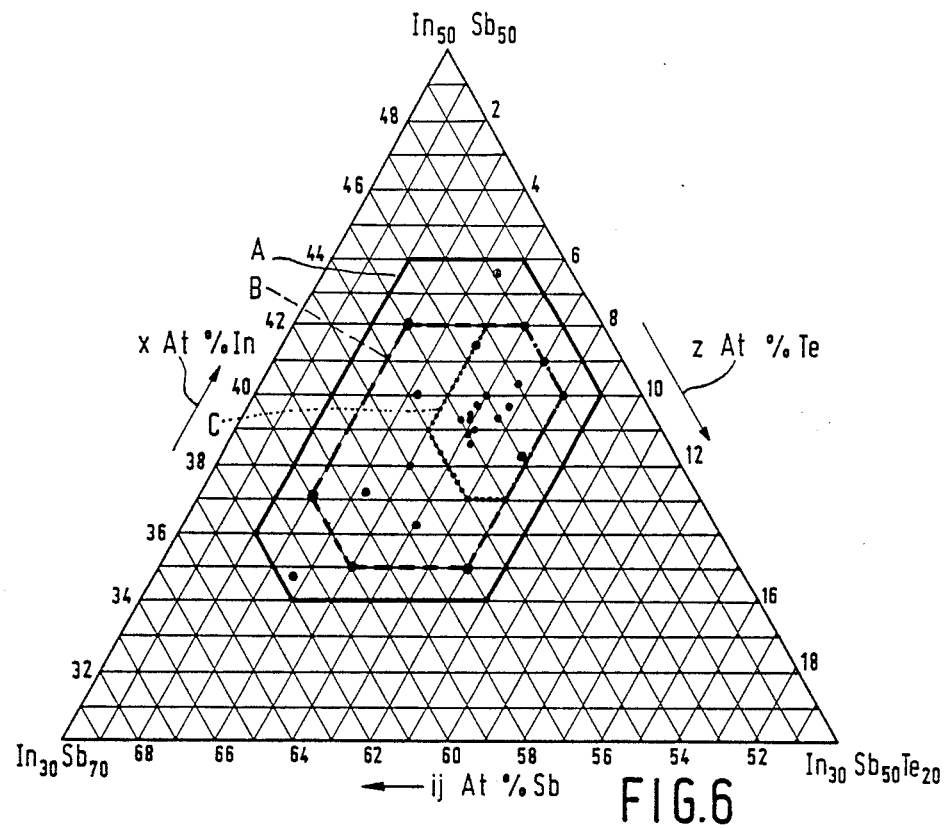
FIG. 6 is a composition diagram of the elements In, Sb and h.

Very short erasing times of, for example, 100 ns or even shorter, can be realised by means of the method according to the invention. The recording material used in the method according to the invention presents the important advantage that the erasing time necessary to crystallize an amorphous area can be adjusted as it depends primarily on the selected quantity of Te within the indicated limits. With comparatively small quantities of Te, for example, an atomic percentage smaller than 5%, a very short erasing time is obtained. By choosing a higher percentage of Te, a longer erasing time can be adjusted, hence a lower crystallization rate. A lower crystallization rate achieved is of importance when the recording rate is low, hence at a comparatively low speed of the element. It is hence possible at the different speeds of the element, in accordance with the use of the element for audio recording, video recording and data recording, not to vary or to vary not only the size of the erasing spot but to adapt the erasing time by a variation of the Te content of the recording layer. The limits of the Te content are 2 and 9 at.%. With a Te content smaller than 2 at.% the crystallization rate is so high that no crystalline amorphous changes are possible any longer and the recording process no longer operates. With Te contents exceeding 9 at.% the crystallization rate is so low that erasing in real time can no longer be carried out adequately.

With an Sb content exceeding 62 at.%, elementary Sb is deposited so that the system is no longer stable. With an Sb content lower than 51 at.% the crystallization rate becomes too high so that the recording process (conversion of the crystalline to the amorphous state) is no longer satisfactory. If the Q content is lower than 34 at.%, the system becomes unstable. With a Q-content exceeding 44 at.% the crystallization rate is too high so that while the erasing process occurs excellently, it is true, but recording information in the crystalline is not converted to the amorphous state is no longer possible or is possible with extreme difficulty only. Very good results are obtained in particular when the Te and Sb contents together amount to 58-65 at.% and more in particular to 58-62 at.%.

The composition of the recording layer may be chosen to be so that extremely short erasing times are realized, hence high crystallization rates. Such a material can be erased at any disc speed. However, it is to be preferred in order to promote the recording process to use, at lower disc speeds, a material having a longer crystallization time.

The recording layer used in the method according to the invention has an excellent stability, not only in the crystalline phase but also in the amorphous phase. The stability of the amorphous phase against crystallization has been established by means of a standard DSC (differential scanning calorimetry) test. It has been found that for the material $In_{40}Sb_{54}Te_6$ the crystallization time of the amorphous phase at 50° C. is $3 \times 10^5$ years. At 100° C. the crystallization time is 8 years. So there is a very great stability.

In a preferred form of the method according to the invention a recording material is used the composition of which satisfies the formula

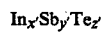

$In_{x'}Sb_{y'}Te_{z'}$ wherein $x' = 35-42$ at.%; $y' = 52-60$ at.%; $z' = 3-8$ at.%.

In this preferred form very high signal-to-noise ratios are obtained with average values of 50-55 dB and highest values of 60 dB. It is to be noted that when replacing Te by Se the signal-to-noise ratios show a lower value.

Excellent results are obtained in particular in a further preferred embodiment of the method in accordance with the invention in which a recording material is used which satisfies the formula

$In_{x''}Sb_{y''}Te_{z''}$ wherein $x'' = 37-42$ at.%; $y'' = 52-56$ at.%; $z'' = 5-8$ at.%.

The linear speed of the rotating recording element depends on the type of information which is recorded, for example audio information, video information or data information, and is, for example, from 1 to 20 m/s. During the recording process the crystalline recording material is heated above the melting temperature in the exposed places so that a melting area is formed which cools so rapidly that no crystallization takes place and an amorphous information bit is formed. The information is recorded at high speed. The pulse time of the laser light beam in which per pulse an information bit is formed, is short and is, for example, from 20 to 100 ns. The formed amorphous information bits have small diametrical dimensions from at most one to a few micrometers so that a high information density is obtained.

In the erasing process the amorphous information areas (information bits) are exposed to the erasing spot. As a result of this an amorphous area is heated to a temperature which is slightly lower than the melting-point of the material in the crystalline phase but higher than the glass transition temperature. As a result of this the amorphous material of such an area becomes less viscous and will return to the thermodynamically more stable crystalline state. The material will have to be kept at the above-mentioned temperature for some time (erasing time) so that all the material in such an area crystallises.

The method according to the invention surprisingly represents the possibility of using very short erasing times. In a preferred form of the method the erasing time per information area is from 50 ns to 5 μs and in particular from 100 ns to 1 μs.

In a further preferred form of the method in accordance with the invention an erasing spot is used which is circular or elliptical and has a maximum diametrical or longitudinal dimension of 3 μm. In particular a circular erasing spot is used having a diameter of 1-2 μm. The required laser power is there lower then. Such a small circular erasing spot, compared with a slot-shaped erasing spot, presents the further advantage of a better focusing on the recording layer and a better control and guidance over the information track. Moreover, the optical device for performing the method is technically simpler in case of a circular erasing spot.

To this connection it is noted that the recording element, in order to have a good control of the recording and erasing process, preferably comprises an optically detectable, spiral-like track. This track is present, for example in the form of a groove in the surface of the substrate on the side of the recording layer. In the case of a substrate of a synthetic material the groove can be provided during the manufacture of the substrate. A suitable manufacturing process is an injection moulding or a compression moulding process in which a hot liquid synthetic material is injected in a mold which comprises a matrix which at its surface has the negative of the desired groove structure. In the case of a substrate of, for example, glass, the groove is provided in a separate layer of synthetic material on the surface of the substrate. The groove is optically detected by means of laser light which is transmitted in via the transparent substrate. The light reflected against the recording layer shows phase differences depending on whether the light is reflected against a groove part or against a land part present beside the groove. The information recorded in the recording element usually lies in the groove part of the recording layer so that a spiral-like information track is formed.

A circular small erasing spot can easily be kept on the information track. In the case of a slot-shaped erasing spot the possibility exists that with some rotation of the spot an adjacent spiral part of the information track is exposed and an undesired erasing process takes place.

Recording and erasing information is carried out by means of a laser light beam which is preferably focused on the recording layer via the substrate. As a result dust particles or scratches present on the substrate fall beyond the depth of focus of the focusing objective so that these contaminations do not influence the quality of recording and erasing. The substrate in that case must be transparent and be manufactured, for example, from glass or a transparent synthetic material, for example, polycarbonate or polymethylmethacrylate.

The circular small erasing spot may be used at all usual speeds of the recording element because, as already been stated before, the composition of the recording layer can be adapted to the exposure time in the erasing process determined by the spot size and the disc(element) speed. At a low disc speed of, say, only 1.5 m/s and a spot size of 2 ∞m, for example, which means an exposure time of 1.3 μs a composition of the recording layer can be chosen having a comparatively high content of the element Te. This material has a comparatively low crystallization speed. At a disc speed of 15 m/s and an erasing spot size of 2 μm, hence with an exposure time of approximately 135 ns, a recording layer will be used which has a comparatively low content of the element Te, hence crystallizes more rapidly and consequently has a short erasing time.

A further favorable embodiment of the method in accordance with the invention is characterized in that the substrate is provided by means of an electroless deposition process with an amorphous recording layer in which by using the erasing spot a spiral-like track of crystalline material is formed, which track has a width of a few microns, amorphous information areas are then formed in the said track by means of a pulsed recording spot and can be converted again selectively by means of the erasing spot into the crystalline phase and be erased.

A suitable deposition process is a vapor deposition process at reduced pressure or a sputtering process in which an amorphous recording layer is obtained. The favorable embodiment presents the advantage that the whole recording layer need not be converted in one separate treatment step from the amorphous to the crystalline phase.

An erasing spot is preferably used which is followed at a short distance by the recording spot. A suitable mutual distance is, for example, from 5–50 μm. Herewith the possibility is presented to record new information directly over old information.

Another preferred embodiment is characterized in that the erasing spot and the recording spot originate from the same laser in which during the recording process the laser is switched at a higher power and is pulsed.

The invention will be described in greater detail with reference to the drawing.

Reference numeral 1 in FIG. 1 denotes a glass substrate. The substrate has the form of a circular disc having a diameter of 30 cm and a thickness of 1-2 mm. The surface of substrate 1 comprises a layer 2 of a UV light-cured acrylate synthetic resin in which a spiral-like groove 3 is provided. The groove has a width of 1.6 μm and a depth of 60 mm. Synthetic resin layer 2 with groove 3 has been manufactured by providing substrate 1 with a layer of a liquid, UV-curable synthetic resin lacquer, pressing the assembly against a matrix surface which comprises a groove structure, exposing the liquid lacquer layer to UV light via the substrate and removing the assembly of substrate with cured lacquer layer from the matrix surface in which the groove structure has been copied from the matrix surface.

A recording layer 4 of $In_{40}Sb_{54}Te_6$ is vapour-deposited on lacquer synthetic resin layer 2 at a pressure of $3.10^{-5}$ Torr by means of a flash evaporator. The rate of deposition is 0.6 nm per second. The thickness of the vapour-deposited layer 4 is 100 nm. During the vapour deposition the substrate 1 is rotated at a frequency of 20 Hz.

The recording layer is covered with a protective layer 11 of a synthetic resin.

After the vapor deposition the layer 4 has an amorphous structure. The groove part 5 of the recording layer is exposed to a continuous laser light beam 6 which is focused on the recording layer 4 via the substrate 1. The laser used has a power of 5 mW on the recording layer 4. The laser light beam produces a light spot on the recording layer, the so-called erasing spot, which is circular and has a cross-section of 2 μm. The erasing spot follows the groove part 5 by using a servo system (control system) not shown in which a weak laser light beam is used which is reflected via the substrate 1 against the layer 4 and which on the basis of phase differences between reflected light originating from groove 5 and land part 7 scans the groove structure. During the exposure with the erasing spot the disc 1 is rotated in which the linear speed at the area of the erasing spot is 5 m/s. As a result of the exposure to the erasing spot a track 8 of a crystalline recording material is formed in the groove part 5. This conversion from amorphous to crystalline takes place during one revolution of the disc 1 hence one passage past the erasing spot.

During or after this erasing run information can be recorded in track 8. For this purpose, track 8 is focused to pulsed laser light 9 which is focused on the track 8 via the substrate 1. The pulse laser light beam 9 produces a light spot (recording spot) on the recording layer 4 at the area of the crystalline track 8. The light spot is circular and has a diameter of 2 $\mu$m. The pulse time is 100 ns. The laser light energy per pulse is 0.6 nJ. The laser light beam 9 is controlled and kept on track 8 by means of the above-mentioned servo systems, not shown. During the recording of information disc 1 is rotated, the linear speed at the area of the recording spot being 5 m/s. Erasing and writing takes place in real time during one revolution of the disc. This may be the same revolution. For obtaining the recording spot the same laser may be used as is used in the erasing process. This laser is then switched temporarily to a higher power in behalf of the recording process and in addition is pulsed. Alternatively a second laser may be used for the recording process. In that case the recording spot can follow the erasing spot at a very short distance, for example a distance of 30 $\mu$m. As a result of the exposure to the recording spot, amorphous information areas 10 (see FIG. 2) having a diameter of approximately 1 $\mu$m are formed in the crystalline track 1. The information areas 10 can be erased selectively and hence be converted again into the crystalline phase by using the above-described erasing spot. Erasing occurs in real time at a linear disc speed of 5 m/s. The erasing time per amorphous area is 400 ns. The amorphous information areas are read by means of a weak continuous laser light which is reflected against the recording layer 4 via the substrate 1. Reading is based on reflection differences, i.e. differences in intensity of the reflected light, between an amorphous information area and the crystalline surrounding thereof (track 8).

The above described erasing-writing process has been repeated 400 times without any problems occurring.

In the same manner as described above information can be recorded and erased at a different speed of the substrate (disc) 1, for example a recording speed of 12 m/s. In that case an erasing spot is used having a circular shape and a diameter of 2 $\mu$m originating from a laser having a power of 16 mW on the recording layer. In the selected erasing of the recording amorphous information areas the erasing time per information area is approximately 170 ns. Information is recorded by means of pulsed laser light at a pulse time of 55 ns and a pulse energy of 0.6 nJ.

Experiments have demonstrated that this rapid recording-erasing process can be repeated 800 times without any problems.

Reference numeral 12 in FIG. 3 denotes a laser. Parallel to laser 12 a second laser 13 is arranged (see FIG. 5). The light beam 14 of laser 12 passes through a lens 15 and is converted into a parallel beam 16, which then passes through a modulator 17. The modulator serves as a light shutter controlled by binary (digital) signals on connection pins 18. The electric signal represent the information to be recorded. The laser light beam 16 when passing through modulator 17 is pulsed in accordance with the binary information to be recorded. It is also possible to pulse laser 12 directly, without the interconnection of a separate modulator, in accordance with the data to be recorded. This is the case when an AlGaAs laser having an emission wavelength of 850 nm is used. The pulsed laser light beam 19 passes through a semipermeable mirror 20 and is then rotated through 90° by reflection against mirror 21. The beam 19 is focused by an objective 22 on a recording element 23 which corresponds to the recording element shown in FIGS. 1 and 2. The recording element 23 comprises a substrate 24 of glass which has a synthetic resin layer 25 in which a groove 26 is provided. Between the grooves a land part 27 is present. Synthetic resin layer 25 comprises a recording layer 28 as stated in the description of FIGS. 1 and 2. The pulsed laser light beam 19 is focused in the groove part of the recording layer 28 via the substrate 24 and produces a pulsed light spot (recording spot) 29 on the recording layer (see FIG. 4). The recording layer 23 is rotated about the axis 30 in which the linear speed of the element at the area of the recording spot is adjusted at a value which generally is between 1 and 15 m/s.

In the places exposed to the recording spot 29 amorphous information areas are formed as was explained with reference to FIGS. 1 and 2. The amorphous information areas are read with weak continuous laser light which is focused on the groove part 26 of recording layer 28 according to the same optical path as shown in FIG. 3. The reflected light beam 30 is intercepted in detector 32 via mirror 21, semipermeable mirror 20 and lens 31, in which the place and length of the information areas are determined on the basis of reflection differences and converted, for example, into an electric signal.

The amorphous information areas are present in a track of a crystalline material provided in the groove part 26 of the recording layer 28 by using an erasing spot 33 (FIG. 4). In the situation shown by FIGS. 3, 4 and 5 the erasing spot originates from a second laser 13 which produces a continuous light beam 34 which traverses substantially the same light path as beam 14, with the proviso that the produced erasing sot 33 has been displaced over a distance of approximately 30 $\mu$m with respect to the recording spot 29. The erasing spot 33 precedes the recording spot 29 so that first a crystalline track is formed in the amorphous recording layer and the amorphous information areas are then provided herein. The amorphous information areas can be erased selectively by the erasing spot in real time during one revolution of the element by the conversion into the crystalline phase.

FIG. 6 shows a composition diagram for In, Sb and Te having at the corners of the composition triangle the indicated compositions $In_{30}Sb_{70}$; $In_{30}Sb_{50}Te_{20}$ and $In_{50}Sb_{50}$. The triangle shown hence is a small part of the total In, Sb, Te diagrams. Within the composition triangle the solid line A denotes a composition area which corresponds to that stated in claim 1. The broken line B denotes an area which is equal to the composition area as claimed in claim 3 and the broken line C denotes a composition area which is equal to that as claimed in claim 4. A representative number of specific compositions which have been used by the Applicants in the method according to the invention are indicated by dots. For convenience these compositions are summarized hereinafter in table form arranged according to an increasing In content (in at.%).

| Composition table belonging to FIG. 6. | | | | | | | | |
|---|---|---|---|---|---|---|---|---|
| In | Sb | Te | In | Sb | Te | In | Sb | Te |
| 34.8 | 61.6 | 3.6 | 38.8 | 55.1 | 6.1 | 40.0 | 54.0 | 6.0 |
| 35.0 | 60.0 | 5.0 | 39.0 | 54.9 | 6.1 | 40.0 | 52.0 | 8.0 |
| 35.0 | 57.0 | 8.0 | 39.2 | 54.8 | 6.0 | 40.3 | 53.0 | 6.7 |
| 36.2 | 57.7 | 6.1 | 39.3 | 55.1 | 5.6 | 41.0 | 52.0 | 7.0 |
| 37.1 | 60.0 | 2.9 | 39.4 | 54.0 | 6.6 | 41.5 | 53.5 | 5.0 |
| 37.2 | 58.5 | 4.3 | 39.4 | 54.7 | 5.9 | 42.0 | 52.0 | 6.0 |
| 38.0 | 57.0 | 5.0 | 39.6 | 53.6 | 6.8 | 42.1 | 56.0 | 2.9 |
| 38.2 | 54.0 | 7.8 | 39.7 | 54.5 | 5.9 | 43.6 | 52.0 | 4.4 |
| 38.6 | 55.2 | 6.2 | 40.0 | 55.8 | 4.2 | | | |

The signal-to-noise ratios of the compositions comprised by line A have an average value of 45–50 dB. In the area denoted by line B an average value of 50–55 dB is reached. The most interesting composition area is that by line C. Herein highest values of 60 dB are denoted. If Se is used instead of Te slightly lower values are obtained.

Figure 7:
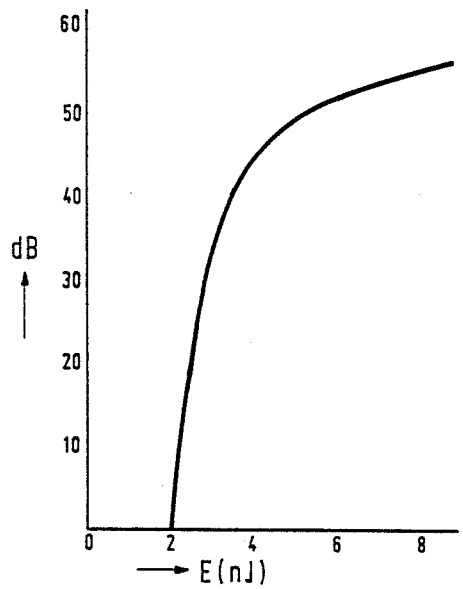
FIG. 7 is a graph showing the relation of the signal-to-noise ratio to the energy used in forming an amorphous information bit in the recording process and FIG. 8 is a graph showing the relation of the decrease in the signal-to-noise ratio to the erasing power of the laser used in the erasing process.

FIG. 7 shows a graph in which the signal-to-noise ratio is plotted in dB against the energy used for making an amorphous information bit. It may be read from the graph, for example, that an information bit obtained by using a laser light energy pulse of 0.8 nJ has a signal-to-noise ratio upon reading of approximately 55 dB. The tests are made in the recording material $In_{41}Sb_{52}Te_7$. The amorphous information bits are recorded in a track of a crystalline material obtained by exposing the recording element during one revolution to a circular light spot originating from a laser having a power of 3 mW. The disc speed is 1.4 m/s. The wavelength of the laser light is 750 nm. The numerical aperture of the optical focusing system is 0.5. Upon writing the amorphous information bits the same laser but then pulsed was used. The laser was switched at various powers (mW) in order to provide the quantities of energy per pulse indicated in the graph. The pulse time in all cases was 60 ns.

Figure 8:
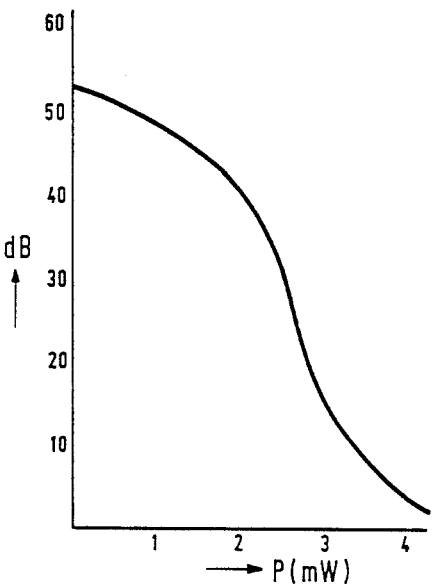

In FIG. 8 the decrease of the signal-to-noise ratio in dB is plotted against the erasing power of the laser used in mW. The laser has a wavelength of 750 nm. The numerical aperture is 0.5. The disc speed is 1.4 m/s. The erasing process was carried out by means of a circular erasing spot having a diameter of 2 μm. The graph indicates the change as a result of only one erasing run, hence one passage of the erasing spot over an information bit. It can be read from the graph that in one erasing run the signal-to-noise ratio has reduced to substantially 0 already with a laser power of slightly more than 4 mW. When using even lower erasing powers, for example 3 mW, a signal-to-noise ratio of 15 dB is present after one erasing run which is then reduced to zero in a subsequent erasing run.

An important aspect of the method in accordance with the invention is that EFM modulated signals can be recorded and read perfectly. An EFM modulated signal is also used, for example, in the well-known Compact Disc. By means of the invention, Compact Disc information can hence be recorded and read also at the same disc speed as used in Compact Disc, namely 1.4 m/s. Such a compatibility is of technical importance. EFM modulation means that amorphous information bits are recorded in the recording layer which have, for example, the form of an ellipse and have different accurately defined, discrete, longitudinal dimensions of 0.9; 1.2; 1.5; 1.8; 2.1; 2.4; 2.7; 3.0 and 3.3 μm. The use of the method according to the invention makes this possible. The information bits of the above-mentioned dimensions may furthermore be scanned, distinguished and hence be read with a great accuracy by means of a laser light beam.

What is claimed is:

1. A method of optically recording and erasing information in which a disc shaped recording element which comprises a substrate and a recording layer provided thereon which comprises a crystalline recording material is rotated and exposed to the light of a recording spot which is moved diametrically over the disc and originates from a laser light beam which is focused on the recording layer and is modulated in accordance with the information to be recorded, amorphous information bits which can be read by means of a weak laser light, which bits can be erased by means of an erasing spot originating from a laser light beam focused on the recording layer, being formed in the exposed places of the recording layer, characterized in that a recording material is used the composition of which satisfies the formula $$Q_xSb_yTe_z$$

wherein Q is the element In or Ga, x=34–44 at.%; y=51–62 at.%; z=2–9 at.%, that the amorphous information bits recorded in the crystalline recording material can be erased in real time during the revolution of the recording element by means of the erasing spot and be returned to the original crystalline state.

2. A method as claimed in claim 1, characterized in that a recording material is used of which the sum of the content of Te and of Sb is from 58 to 65 at.%.

3. A method as claimed in claim 1, characterized in that a recording material is used which satisfies the formula $$In_{x'}Sb_{x'}Te_{z'}$$

wherein x'=35–42 at.%; y'=52–60 at.%; z'=3–8 at.%.

4. A method as claimed in claim 2, characterized in that a recording material is used which satisfies the formula $$In_{x''}Sb_{y''}Te_{41}$$

wherein x''=37–42 at.%; y''=52–56 at.%; z''=5–8 at.%.

5. A method as claimed in claim 4, characterized in that the information bits are erased by means of an erasing spot which is circular or elliptical and has a maximum diametrical or longitudinal dimension of 3 μm.

6. A method as claimed in claim 1, characterized in that the erasing time per informtion bit is 50 ns–5 μs and in particular 100 ns–1 μs.

7. A method as claimed in claim 1, characterized in that the substrate is provided with an amorphous recording layer by means of an electroless deposition process, in which layer a spiral-like track of crystalline material is formed by using the erasing spot, which track has a width of a few microns, amorphous information bits are then formed in said track by means of a pulsed recording spot, which bits can then be converted again selectively into the crystalline phase by means of the erasing spot and be erased.

8. A method as claimed in claim 7, characterized in that the erasing spot is followed at a small distance by the recording spot.

9. A method as claimed in claim 7, characterized in that the erasing spot and the recording spot originate from the same laser in which during the recording process the laser is switched to a higher power and is pulsed.

* * * * *